United States Patent
Lederer

(10) Patent No.: US 6,635,010 B1
(45) Date of Patent: Oct. 21, 2003

(54) ENDOSCOPE OBJECTIVE

(75) Inventor: Frank Lederer, Tuttlingen (DE)

(73) Assignee: Karl Storz GmbH & Co. KG (DE)

( * ) Notice: Subject to any disclaimer, the term of this patent is extended or adjusted under 35 U.S.C. 154(b) by 0 days.

(21) Appl. No.: 09/507,196

(22) Filed: Feb. 18, 2000

Related U.S. Application Data

(63) Continuation of application No. PCT/DE98/02478, filed on Aug. 24, 1998.

Foreign Application Priority Data

Aug. 22, 1997 (DE) .......................... 197 36 617

(51) Int. Cl.$^7$ ................................. A61B 1/00
(52) U.S. Cl. ........................ 600/171; 600/176
(58) Field of Search ................. 600/171, 176; 359/833–836

(56) References Cited

U.S. PATENT DOCUMENTS

| | | | | |
|---|---|---|---|---|
| 2,783,757 A | * | 3/1957 | Scholz .................. | 600/176 |
| 3,884,548 A | * | 5/1975 | Linder .................. | 359/554 |
| 4,655,557 A | * | 4/1987 | Takahashi ................ | 350/445 |
| 4,684,224 A | | 8/1987 | Yamashita et al. | |
| 4,783,156 A | * | 11/1988 | Yokota .................. | 359/736 |
| 4,815,833 A | * | 3/1989 | Zobel et al. ............. | 359/726 |
| 4,846,154 A | * | 7/1989 | MacAnally et al. ........ | 600/173 |
| 4,850,342 A | * | 7/1989 | Hashiguchi et al. ........ | 600/171 |
| 4,976,524 A | | 12/1990 | Chiba | |
| 5,014,121 A | * | 5/1991 | Hasegawa et al. .......... | 348/65 |
| 5,199,417 A | * | 4/1993 | Muller et al. ............ | 600/128 |

* cited by examiner

*Primary Examiner*—John P. Leubecker
(74) *Attorney, Agent, or Firm*—St. Onge Steward Johnston & Reens LLC

(57) ABSTRACT

Endoscope objective having a viewing direction including an angle< >0° relative to the longitudinal axis of the endoscope, comprising a lens system imaging the object field into a single image plane disposed orthogonally on the longitudinal axis, and a prism unit disposed downstream of the distal window of the endoscope along the imaging path, in which the beam is reflected on two boundary surfaces such that the beam will be deflected in the prism unit from the desired viewing direction into the longitudinal axis of the endoscope, wherein a coating is applied on at least one surface on the prism unit, which comprises a thin layer having a refractive index smaller than the refractive index of the material which said prism unit is made of, so that total reflection against the layer occurs. The invention is characterized by the provision that the coating is applied to that surface of the prism unit which faces the glass cover of the endoscope.

31 Claims, 1 Drawing Sheet

ENDOSCOPE OBJECTIVE

This application is a continuation of application No. PCT/DE 98/02478 filed Aug. 24, 1998.

FIELD OF THE INVENTION

The present invention relates to an endoscope objective having a viewing direction that includes an angle of < >0° relative to the longitudinal axis of the endoscope, i. e. to an endoscope objective of a so-called inclined-eyepiece endoscope.

PRIOR ART

Endoscope objectives of this type are commonly known. German Patent DE 35 37 155 A1 discloses an objective comprising of a lens system which forms the image of the object field of the objective in an image plane that is disposed orthogonally on the longitudinal axis of the endoscope.

That known objective comprises a lens system which forms the image of the object field of the objective in an image plane that is disposed orthogonally on the longitudinal axis of the endoscope. The image formed in the image plane is then relayed or imaged, respectively, by an image relay system into a proximal image plane. Between the lenses of the lens system a dual section prism unit is disposed in which the beam is so reflected on two boundary surfaces that the beam is deflected in the prism unit from the desired viewing direction into the longitudinal axis of the endoscope, i. e. into the optical axis of the image relay system.

In accordance with prior art as known from that reference a layer consisting of $MgF_2$ is applied on an outside of the dual section prism unit, through which the beam should not pass, with the beam undergoing total reflection against this layer.

Due to the use of a dual section prism unit the system with an inclined eyepiece for endoscopes, as it is known from the German Patent DE 35 37 155 A1, is complex and hence expensive to manufacture.

With a system known from the U.S. Pat. No. 4,684,224 an optical flat on which a plano-concave lens is cemented is applied on the entrance surface of a prism changing the viewing angle.

On account of the application of this optical flat the known endoscope objective is equally comparatively complex and hence expensive. Moreover, the space required for the accommodation of the optical flat must not be neglected.

It is furthermore known that an air gap is provided instead of the optical flat. However, this is possible only with endoscopes having a comparatively wide diameter whilst the assembly is practically no longer possible with endoscopes having a diameter of 4 mm or less.

BRIEF DESCRIPTION OF THE INVENTION

The present invention is now based on the problem of improving an endoscope of the claimed general type in such a way that air gaps or prisms having a dual segment structure can be dispensed with on optical flats applied on the entrance surface of the prism.

In accordance with the invention the coating is applied on that surface of the prism unit which faces the glass cover of the endoscope. In distinction from the inclined-eyepiece system known from the German Patent DE 35 37 155 A1 the thin layer, which has a refractive index smaller than the refractive index of the material which the prism unit is made of so that total reflection occurs on the thin layer rather than on air or another glass material, serves a double function:

Firstly, the beam entering the objective passes through the coating, and secondly it serves for total reflection of this beam after it had been reflected on another surface. The coating must hence be made of optically transparent materials. It is particularly preferable that the coating serves at the same time as stratified system reducing reflection.

Compared against the application of an optical flat, the application of an optical coating and particularly a thin layer by means of a common coating process, e. g. by way of vacuum evaporation, is a comparatively simple and low-cost technique. The application of an optical coating having a thickness of a few $\mu m$ with a single layer is sufficient in order to allow for total reflection with negligibly small losses in reflection.

On account of the use of a thin layer it is no longer necessary to provide an air gap so that a mechanical spacer is not required because one element of the objective can be arranged on the layer of the prism unit. Compared against conventional endoscope objectives of different types, the assembly is hence definitely simplified. And there is no occurrence of losses in absorption, as is the case with reflection on metal layers.

In particular, the element and the prism unit can be cemented to each other.

The element may have a wedge shape, which provides for an additional deflection of the viewing direction and hence permits adjustment of the viewing direction, or the distal window of the endoscope. This distal window may be configured as plano-concave lens in the usual manner.

In another embodiment, the prism unit presents three optically operative surfaces whereof one surface, through which the beam arriving from the object field, enters into the prism unit, includes an angle relative to the longitudinal axis of the endoscope, whilst another surface is disposed in parallel with or at an inclination relative to the longitudinal axis and the third surface is arranged orthogonally on the longitudinal axis.

In this configuration, in particular, a coating having the inventive formation may be applied merely on the first surface whereas the second surface is mirrored.

The aforedescribed configuration is expedient particularly in the case of 60° prisms. There the second surface is arranged to be parallel with the longitudinal axis of the endoscope. With the arrangement of the second surface at an angle relative to the longitudinal axis of the endoscope varied angles of the viewing direction are obtained. Other angles can also be achieved with the provision that the wedge shaped element is provided for additional deflection of the viewing direction or that an oblique passage of the optical axis through the entrance window is permitted, i.e. at an angle at variance from 90°, as will be explained still in the following.

As has been set out above, the wedge shaped element may be disposed on the coating directly.

The coating may consist of several layers having different refractive indices. In such a configuration the lowermost layer may be a low-diffraction layer where total reflection occurs. It is particularly preferred, however, that the lowermost layer is a high-diffraction layer and particularly a layer promoting adherence so that total reflection takes place in the coating. It is also possible in particular that several low-diffraction layers are provided. Total reflection can occur on or within the coating.

It is, of course, equally possible that the coating is a single-layer system including only a single low-diffraction layer.

The viewing angle can moreover also be adjusted by the provision that the passage of light takes place through the lens on the object side at an inclination. The imaging errors induced by the oblique passage of the light can then be compensated in the objective.

BRIEF DESCRIPTION OF THE DRAWING

The invention will be described in more details by one exemplary embodiment in the following, with reference to the drawing wherein Figure one is a longitudinal section taken through an inventive endoscope objetive.

Figure two is a longitudinal section taken through another embodiment of the endoscope objetive

DESCRIPTION OF AN EMBODIMENT

Figure 1:
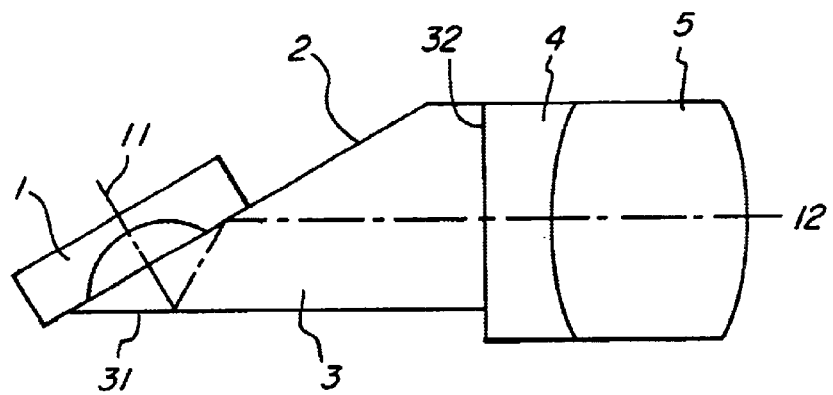

The inventive endoscope objective having a viewing direction 11 including an angle different from 0°, specifically 60°, relative to the longitudinal axis of the endoscope which is not shown in more details here, comprises a lens system consisting of lenses 1, 4 and 5 as well as further lenses if necessary, which lens system serves to image an object field into an image plane arranged orthogonally on the longitudinal axis 12 of the endoscope. This image can then be passed through an image relay system which is not illustrated here, such as a fibre bundle, a relay lens system or a video pickup, to the proximal end of the endoscope.

A prism unit 3 is provided within the lens system, in which the beam is reflected at two boundary layers, i. e. the surfaces 31 and 2, so that the beam is deflected from the desired viewing direction 11 into the longitudinal axis 12 of the endoscope in the prism unit and hence enters from the surface 32 into the joining lenses 4 and 5.

In accordance with the invention a thin layer or a stratified system consisting of several layers 35 is applied on the surface 2 of the prism unit with common coating techniques. At least one of these layers has a refractive index which is definitely smaller than the refractive index of the material which the prism unit 3 is made of. Hence total reflection occurs against the layer rather than air at the thin layer.

Then also total reflection occurs, too, at specific angles in particular when the refractive indices of the materials of the elements 1 and 3 are only slightly different or when the material of the element 1 has a refractive index which is even higher than the refractive index of the material of the prism 3.

In the illustrated embodiment of the invention the thin layer consists of $MgF_2$ which has a refractive index of 1.38. The prism unit 3 consists of LaSF N31 having a refractive index of 1.88 so that the difference between the refractive indices amounts to 0.5. With a thickness of the layer in excess of $1.2 \cdot \lambda$, with $\lambda$ being a typical wavelength of the used light, total reflection is achieved practically without any losses, with the thin layer consisting of $MgF_2$ resulting in a reduction of reflection in transmission by roughly 50%.

In the illustrated embodiment in Figure One the viewing direction is 60°. The invention can, of course, also be employment with prisms for other viewing directions, e.g. of 30°, 45°, 90°, while mechanical spacer can be dispensed with even when the plano-concave lens 1 has a refractive index which is comparable to the refractive index of the prism unit 3.

Figure 2:
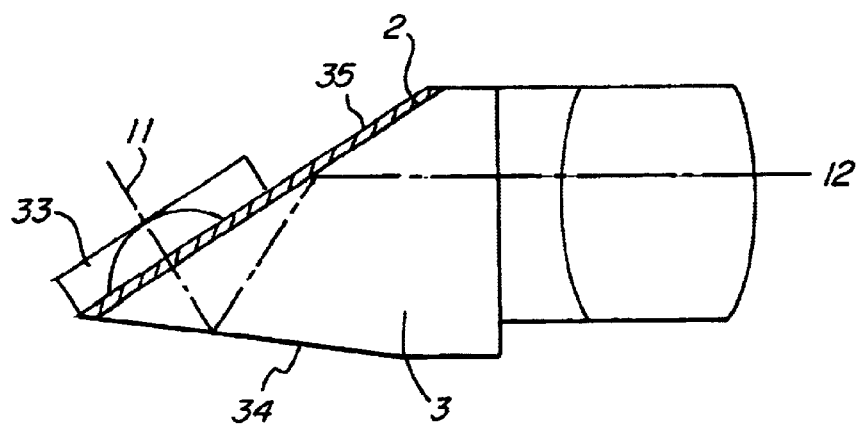

In an alternate embodiment, shown in FIG. 2, wedge 33 is shown to provide additional deflection of the viewing direction and, hence, permits adjustment of the viewing direction. FIG. 2 also depicts angled second surface 34 for varying angles of viewing directions. Angled second surface 34 is at a nonzero angle from the longitudinal axis of the endoscope. The embodiment further includes multilayered coating 35 on surface 2 of the prism unit, where at least one of the layers has a refractive index smaller than the refractive index of the material with which the prism unit 3 is made. Hence, total reflection occurs against the layer rather than air at the thin layer.

Even though the invention has been described in the foregoing with reference to a specific embodiment, without any restriction of the general inventive idea, the prism unit may also consist of materials other than the indicated material; it is also possible to use materials other than $MgF_2$ for the thin layer or coatings consisting of several layers. In the case of different viewing angles the shape of the prism unit must be matched appropriately.

What is claimed is:

1. Endoscope objective having a viewing angle including an angle of < >0° relative to a longitudinal axis of the endoscope, comprising:

a lens for imaging an object field into a single image plane disposed orthogonally on the longitudinal axis, a prism having a surface;

said surface including a coating that comprises a thin layer having a refractive index smaller than a refractive index of said prism so that total reflection occurs against the layer;

said surface of said prism is in direct contact with the lens, disposed downstream of a portion of the lens along an imaging path, in which a beam is reflected on two surface areas such that the beam will be deflected in the prism from the viewing angle into the longitudinal axis of the endoscope, and characterized in that said coating is applied on an entire said surface of said prism facing a distal end of the endoscope.

2. Endoscope objective according to claim 1, characterized in that one element of said lens system is arranged on the coating of said prism unit.

3. Endoscope objective according to claim 2, characterized in that said one element and said prism unit are cemented to each other.

4. Endoscope objective according to claim 2, characterized in that said one element is a wedge which provides for additional deflection of the viewing direction.

5. Endoscope objective according to claim 2, characterized in that said one element is a distal window.

6. Endoscope objective according to claim 5, characterized in that the distal window is configured as a plano-concave lens.

7. Endoscope objective according to claim 1, characterized in that said prism unit presents three optically operative surfaces whereof a first surface, through which the beam arriving from the object field enters into said prism unit, is applied on said coating and includes an angle relative to the longitudinal axis of the endoscope, and a second surface reflects the beam back to said first surface where it undergoes total reflection, and a third surface through which the beam emerges, is arranged orthogonally on said longitudinal axis.

8. Endoscope objective according to claim 7, characterized in that a coating is applied merely on said first surface.

9. Endoscope objective according to claim 7, characterized in that said second surface is mirrored.

10. Endoscope objective according to claim 7, characterized in that said prism is a 60° prism.

11. Endoscope objective according to claim 10, characterized in that said second surface is disposed in parallel with the longitudinal axis of said endoscope.

12. Endoscope objective according to claim 7, characterized in that said second surface includes an angle relative to the longitudinal axis of the endoscope.

13. Endoscope objective according to claim 1, characterized in that the coating consists of several layers having different refractive indices.

14. Endoscope objective according to claim 13, characterized in that said coating includes at least one layer having a low refractive index.

15. Endoscope objective according to claim 14, characterized in that said coating comprises two or more layers having low refractive indices.

16. Endoscope objective according to claim 13, characterized in that the lowermost layer is a low-refraction layer on which total reflection occurs.

17. Endoscope objective according to claim 13, characterized in that the lowermost layer is a high-refraction layer and a layer promoting adherence in particular.

18. Endoscope objective according to claim 1, characterized in that said coating is a single-layer system.

19. Endoscope objective according to claim 1, characterized in that the beam enters the lens system on the object side at an inclination.

20. Endoscope objective according to claim 19, characterized in that the imaging errors due to the inclined passage of light are compensated in the objective.

21. Endoscope objective having a viewing angle including an angle of < >0° relative to
   a longitudinal axis of the endoscope, comprising:
      a lens for imaging an object field into a single image plane disposed orthogonally on the longitudinal axis,
      a prism having a surface;
         said surface including a coating that comprises a thin layer having a refractive index smaller than a refractive index of said prism so that total reflection occurs against the layer;
         said surface of said prism is in direct contact with the lens, disposed downstream of a portion of the lens along an imaging path, in which a beam is reflected on two surface areas such that the beam will be deflected in the prism from the viewing angle into the longitudinal axis of the endoscope, and
      characterized in that said coating is applied on an entire said surface of said prism facing a distal end of the endoscope and
      characterized in that said coating consists of several layers having different refractive indices.

22. Endoscope having a longitudinal axis and a viewing angle of < >0° relative to said longitudinal axis of the endoscope, comprising:
   an objective lens disposed at a distal end of said endoscope to receive light beams substantially at said viewing angle from an object field;
   a prism disposed along said longitudinal axis, having
      a first prism surface at an angle relative to the longitudinal axis of the endoscope for receiving and passing the light beams from said objective lens;
      a second prism surface for internally reflecting the light beams passed by said first prism surface back onto said first prism surface, so that the light beams are totally internally reflected at said first prism surface along the longitudinal axis of said endoscope; and
      a third prism surface through which the light beams totally internally reflected at said first prism surface emerge from said prism along the longitudinal axis of said endoscope;
   and a lens system disposed long said longitudinal axis for receiving the light beams emerging from said prism unit and imaging the object field onto a single image plane disposed orthogonally to said longitudinal axis;
   wherein
      said first prism surface is entirely provided with a transparent thin coating formed by vapor deposition and including at least one layer having a refractive index smaller than that of a material of said prism, so that the light beams from said objective lens are transmitted by said coating and the light beams internally reflected from said second prism surface to said first prism surface are totally internally reflected at said coating; and
      the objective lens is disposed on and cemented to a distal end portion of said coated first prism surface.

23. Endoscope according to claim 22, wherein the objective lens is a plano-concave lens.

24. Endoscope according to claim 22, wherein the second prism surface is provided with a mirror coating.

25. Endoscope according to claim 22, wherein said second prism surface is disposed in parallel with the longitudinal axis of the endoscope.

26. Endoscope according to claim 22, wherein said second prism surface is disposed at an angle relative to the longitudinal axis of the endoscope.

27. Endoscope according to claim 22, wherein the coating consists of several layers having different refractive indexes.

28. Endoscope according to claim 27, wherein a lowermost layer of said coating is a low-refraction layer at which total internal reflection of the light beams occurs.

29. Endoscope according to claim 27, wherein a lowermost layer of said coating is a high refraction layer and particularly a layer which promotes adherence.

30. Endoscope objective according to claim 22, wherein said coating is a single-layer system.

31. Endoscope according to claim 22, wherein said coating consists of $MgF_2$.

* * * * *